United States Patent [19]
Brissenden et al.

[11] Patent Number: 5,380,255
[45] Date of Patent: Jan. 10, 1995

[54] TRANSFER CASE FOR PART TIME FRONT WHEEL DRIVE IN A FOUR WHEEL DRIVE MOTOR VEHICLE

[75] Inventors: James S. Brissenden, Baldwinsville; Richard A. Bakowski, Warners, both of N.Y.

[73] Assignee: New Venture Gear, Inc., Troy, Mich.

[21] Appl. No.: 9,234

[22] Filed: Jan. 26, 1993

[51] Int. Cl.$^6$ .................... F16H 37/08; B60K 17/346
[52] U.S. Cl. .................... 475/204; 475/206; 180/233; 180/247
[58] Field of Search ............... 475/204, 206, 249, 250; 180/233, 247, 248

[56] References Cited

U.S. PATENT DOCUMENTS

| | | | |
|---|---|---|---|
| 4,417,642 | 11/1983 | Suzuki | 475/204 X |
| 4,605,087 | 8/1986 | Ashauer et al. | 180/233 X |
| 4,723,624 | 2/1988 | Kawasaki et al. | 180/233 |
| 4,744,435 | 5/1988 | Schnurer | 180/267 X |
| 4,779,699 | 10/1988 | Hataro | 475/206 X |
| 4,867,260 | 9/1989 | Cameron et al. | 180/233 X |
| 5,083,478 | 1/1992 | Hiraiwa | 180/247 |
| 5,286,238 | 2/1994 | Shimizu et al. | 180/247 X |

*Primary Examiner*—Dirk Wright
*Assistant Examiner*—Khoi Q. Ta
*Attorney, Agent, or Firm*—Harness, Dickey & Pierce

[57] ABSTRACT

The present invention provided a power transfer system for a four-wheel drive vehicle. The transfer system includes a part-time transfer case having an input member rotatably driven by the vehicle's engine, first and second output members operable to rotatively drive respective front and rear axle assemblies, and an intermediate shaft through which power is selectively transferred from the input member to one or both of the first and second output members. In operation, driven rotation of the intermediate shaft causes power to be constantly delivered to the first output member and the front axle assembly for establishing a two-wheel drive mode of operation. Moreover, selective actuation of a mode shift arrangement functions to interconnect the second output member to the intermediate shaft for also delivering power to the rear axle assembly for establishing a four-wheel drive mode of operation.

15 Claims, 2 Drawing Sheets

| TITLE | RANGE SLEEVE | MODE SLEEVE |
|---|---|---|
| TWO-WHEEL HI-RANGE | H | X |
| FOUR-WHEEL HI-RANGE | H | Y |
| NEUTRAL | N | Y |
| FOUR-WHEEL LO-RANGE | L | Y |

TRANSFER CASE FOR PART TIME FRONT WHEEL DRIVE IN A FOUR WHEEL DRIVE MOTOR VEHICLE

BACKGROUND OF THE INVENTION

The present invention relates generally to four-wheel drive vehicles and, more particularly, to a part-time transfer case for use in front wheel drive vehicular applications.

With the advent of increased consumer popularity in four-wheel drive passenger cars and sport/utility vehicles, part-time transfer cases are more frequently being incorporated in vehicular driveline applications. As is known, conventional part-time transfer cases are used in four-wheel drive vehicles to normally deliver power to the rear wheels of the vehicle for establishing a two-wheel drive operating mode. However, such part-time transfer cases are also operable for selectively delivering power to both the front and rear wheels for establishing a four-wheel drive operating mode. Since the weight distribution for most four-wheel drive vehicles is biased toward the front wheels (i.e., due to the weight of the engine and transmission), during two-wheel drive operation the greatest potential for wheel slip due to lost traction is associated with the driven rear wheels. This being the case, the need exists to provide a part-time transfer case which normally delivers power to the front wheels of the vehicle in the two-wheel drive mode and yet is operable for selectively delivering power to both the front and rear wheels in the four-wheel drive mode.

SUMMARY OF THE INVENTION

Accordingly, it is an object of the present invention to overcome the disadvantages associated with conventional four-wheel drive vehicles by providing a power transfer system including a part-time transfer case which can be selectively shifted between a two-wheel drive mode for normally delivering power to the front wheels, and a four-wheel drive mode for selectively delivering power to all four wheels.

As a related object, the part-time transfer case of the present invention can be readily substituted for conventional transfer cases in a manner permitting utilization of standardized high-volume driveline components. Otherwise stated, it is an object of the present invention to provide a part-time transfer case that is normally operative in a front-wheel drive mode and yet which is adapted to cooperate with original equipment driveline components from conventional four-wheel drive vehicles.

It is yet another object of the present invention to provide the part-time transfer case with a mode shift arrangement that is operable for permitting the vehicle operator to selectively transfer power to the rear wheels in addition to the front wheel for establishing the four-wheel drive mode of operation.

In accordance with the above and other objects, the present invention is preferably embodied by a part-time transfer case having an input member rotatably driven by the vehicle's engine, first and second output members operable to rotatively drive respective front and rear axle assemblies, and an intermediate shaft through which power is selectively transferred from the input member to one or both of the first and second output members. In operation, driven rotation of the intermediate shaft causes power to be constantly delivered to the first output member and the front axle assembly for establishing the two-wheel drive mode. Moreover, selective actuation of the mode shift arrangement functions to interconnect the second output member to the intermediate shaft for also delivering power to the rear axle assembly, thereby establishing the four-wheel drive mode.

BRIEF DESCRIPTION OF THE DRAWINGS

Further objects, features and advantages of the present invention will become apparent from analysis of the following written specification, the accompanying drawings and the appended claims in which:

DETAILED DESCRIPTION OF THE INVENTION

In general, the present invention is directed to a part-time transfer case that is adapted for normally delivering drive torque to the front wheels of the four-wheel drive motor vehicle for establishing a two-wheel drive mode. The transfer case includes means for permitting the vehicle operator to selectively transfer drive torque to the rear wheels in addition to the front wheels for establishing a four-wheel drive mode. Such a four-wheel drive arrangement is advantageous in vehicular applications where the vehicle's weight distribution is biased over or toward the front wheels so as to deliver drive torque to the wheels having the greatest tractive potential during two-wheel drive operation. As will be appreciated, the part-time transfer case of the present invention can be originally installed or easily retro-fitted into conventional four-wheel drive vehicles without necessitating the use of new or modified driveline components.

Figures 1, 3:
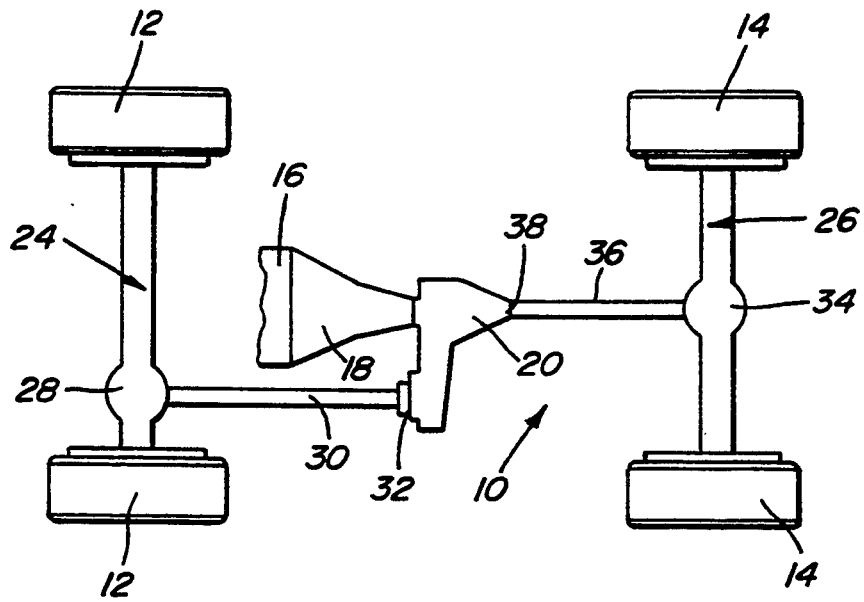
FIG. 1 is a schematic representation of a four-wheel drive vehicle equipped with a part-time transfer case operable for normally delivering power to the front wheels when operating in the two-wheel drive mode.

With particular reference to FIG. 1, a drivetrain 10 for a four-wheel drive vehicle is shown which incorporates the novel principles of the present invention. The motor vehicle drivetrain 10 has a pair of front wheels 12 and a pair of rear wheels 14 both drivable from a source of power, such as an engine 16, through a transmission 18 which may be of either the manual or automatic type. In the particular embodiment shown, drivetrain 10 is arranged as a front wheel drive system which incorporates a part-time transfer case 20 operable to receive drive torque from engine 16 and transmission 18 for normally driving front wheels 12 in a two-wheel drive mode of operation. In addition, part-time transfer case 20 is adapted to permit a vehicle operator to also transfer drive torque to rear wheels 14 for defining a four-wheel drive mode of operation. Front wheels 12 and rear wheels 14 are connected at opposite ends of front and rear axle assemblies 24 and 26, respectively. As is known in the art, a front differential 28 is interconnected between front axle assembly 24 and one end of a front drive shaft 30. The opposite end of front drive shaft 30 is interconnected to a first output shaft 32 of transfer case 20. As such, front wheels 12 are rotatably driven by front drive shaft 30 when part-time transfer case 20 is operating in either of the two-wheel drive mode or the four-wheel drive mode. Similarly, rear axle assembly 26 includes a rear differential 34 that is coupled in driven relationship to one end of a rear drive shaft 36, the opposite end of which is coupled to a second output shaft 38 of part-time transfer case 20 for driving rear wheels 14 when part-time transfer case 20 is operating in the four-wheel drive mode.

Figure 2:
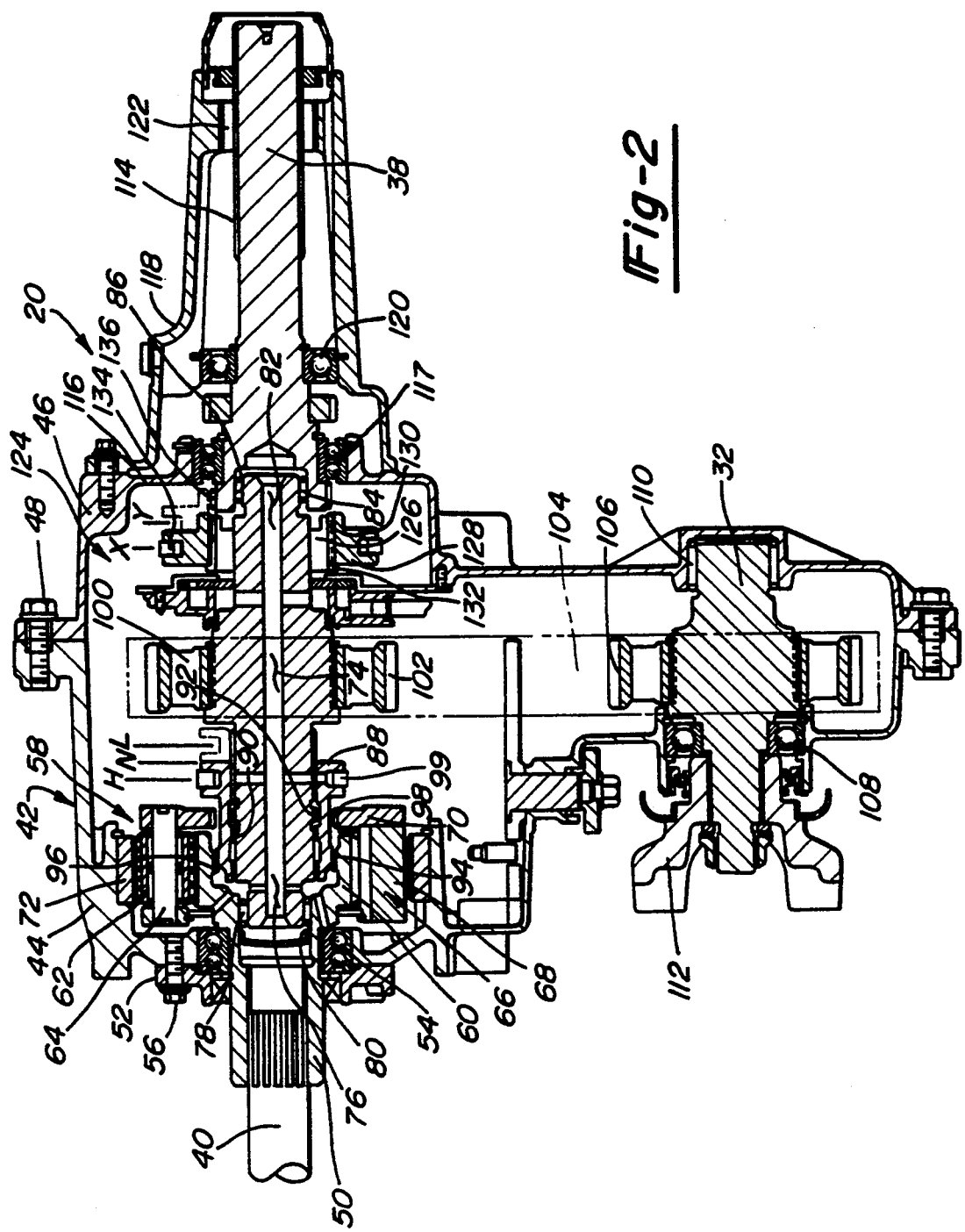
FIG. 2 is a cross-sectional view of the part-time transfer case of the present invention; and, FIG. 3 is a table listing the transfer case shift positions for the various operating modes.

With particular reference now to FIGS. 2, a transmission output shaft 40 is shown which couples transmission 18 to transfer case 20 for supplying power (i.e., drive torque) thereto. Part-time transfer case 20 is shown to include a housing 42 formed by front and back half sections 44 and 46, respectively, that are suitably interconnected by a plurality of bolts 48. Front half section 44 receives transmission output shaft 40 within an internally splined input shaft 50. Input shaft 50 is rotatably mounted in a collar portion 52 by bearing assembly 54 with collar portion 52 being secured by bolts 56 to housing front half section 44. A speed reduction unit, such as planetary gear set 58, is provided for establishing a direct drive ("high"), reduced ratio ("low") and a "neutral" speed ranges as will be described further hereinafter. Planetary gear set 58 includes a sun gear 60 that is integrally formed on input shaft 50 and shown meshed with a plurality of planet gears 62. Each planet gear 62 is rotatably journalled on a pin 64 supported in a planetary carrier 66. Planetary carrier 66 includes fore and aft ring members 68 and 70, respectively. In addition, planet gears 62 also mesh with an annulus gear 72 that is fixedly secured to the inner surface of housing front section 44. Thus, rotation of input shaft 50 causes carrier 66 to rotate at a reduced speed ratio relative thereto. As will be appreciated, planetary gear set 58 is merely exemplary of one type of speed reduction unit which is well suited for use in part-time transfer case 20.

With continued reference to FIG. 2, an intermediate shaft 74 is aligned on the longitudinal axis of input shaft 50 and has a first end portion 76 supported by bearing assembly 78 in an axial bore 80 formed in input shaft 50. Likewise, a second end portion 82 of intermediate shaft 74 is supported by bearing assembly 84 in an axial bore 86 formed in second output shaft 38. Moreover, a range collar 88 is supported for rotation with, and axial sliding movement on, intermediate shaft 74 by means of collar internal splines 90 engaged with external splines 92 formed on intermediate shaft 74. Range collar 88 also includes external clutch teeth 94 shown slidably engaged with internal clutch teeth 96 formed in an axial counterbore of input shaft 50. In the position shown, power (i.e., drive torque) is transferred from input shaft 50 to intermediate shaft 74 via range collar 88, thereby establishing a direct drive or "high" range position indicated by the construction line "H". When range collar 88 is slid rearwardly to establish a reduced ratio or "low" range position, as indicated by construction line "L", its external clutch teeth 94 engage internal clutch teeth 98 formed on aft carrier ring 70. It will be noted that when range collar 88 is moved rearwardly a predetermined distance from its high range "H" position, its external clutch teeth 94 are disengaged from sun gear internal clutch teeth 96 and aft carrier ring internal clutch teeth 98 for defining a "neutral" drive range position indicated by construction line "N". With part-time transfer case 20 shifted into the "neutral" position, input shaft 50 is disconnected from range collar 88 such that no torque is transmitted to intermediate shaft 74, whereby no power is transmitted to either of the vehicle's front wheels 12 or rear wheels 14. Preferably, range collar 88 is selectively shiftable via movement of a range fork, partially shown at 99, that is coupled to a conventional shift fork assembly (not shown) in a manner known in the art. It is to be understood that the conventional shift fork assembly can be selectively shifted by the vehicle operator between the various speed ranges either manually (i.e. via a shift lever) or electrically (i.e., via a motor driven system).

To provide means for transferring power from intermediate shaft 74 to first output shaft 32, a chain carrier 100 is fixedly retained on intermediate shaft 74. Chain carrier 100 includes a drive sprocket 102 drivingly engaging a chain, shown in dashed lines at 104, which, in turn, is coupled to a lower driven sprocket 106. In addition, driven sprocket 106 is coupled to, or an integral portion of, first output shaft 32 of part-time transfer case 20. Thus, torque is transferred to front wheels 12 when range collar 88 is in either of its high "H" range or low "L" range positions. First output shaft 32 is shown mounted for rotation within front housing section 44 by ball bearing assembly 108 and within rear housing section 46 by roller bearing assembly 110. Furthermore, transfer case first output shaft 32 is adapted to be operably connected by a first coupling 112 to the motor vehicle's front drive shaft 30. Similarly, second output shaft 38 is suitably connected by a second coupling (not shown) or splines 114 to the vehicle's rear drive shaft 36. Second output shaft 38 is shown to have one end supported for rotation within web portion 116 by a suitable bearing assembly 117. The remainder of second output shaft 38 extends through a tubular housing extension 118 and is supported for rotation therein via bearing assemblies 120 and 122.

According to the teaching of the present invention, means are provided for mechanically shifting part-time transfer case 20 between the normal two-wheel drive mode and the four-wheel drive mode. According to the embodiment shown, the means to shift transfer case 20 between its two-wheel drive mode and four-wheel drive mode includes a "mode" shift arrangement 124 having a hub member 126 that is fixed for rotation with intermediate shaft 74. In addition, a mode sleeve 128 is formed with internal spline teeth 130 which are in constant axial sliding engagement with external spline teeth 132 formed on hub member 126. A mode fork, partially shown at 134, is coupled to mode sleeve 128 for permitting the vehicle operator to axially shift mode sleeve 128 via selective actuation of the shift fork assembly. Mode sleeve 128 is shown disengaged from external spline teeth 136 formed on second output shaft 38, as is indicated by the construction line "X", for causing intermediate shaft 74 to only transfer drive torque to first output shaft 32, thereby establishing the two-wheel drive mode of operation. When it is desired to shift part-time transfer case 20 into the four-wheel drive mode, mode sleeve 128 is selectively shifted from the two-wheel drive mode "X" position to the four-wheel drive mode position, indicated by the construction "Y", by sliding internal spline teeth 130 into driving engagement with external spline teeth 136 on second output shaft 38. In this "lock-up" condition, drive torque is delivered from intermediate shaft 74 to second output shaft 38 as well as to front output shaft 32.

Mode shift arrangement 124 is shown as a non-synchronized arrangement that is capable of being shifted "on-the-fly" between the two-wheel drive and four-wheel drive mode positions. More specifically, with rear axle assembly 26 being of the solid axle type, non-driven rotation of rear wheels 14 cause concomitant rotation of rear drive shaft 36 and, in turn, second output shaft 38. As such, when the vehicle is moving in a substantially straight ahead direction, second output shaft 38 is rotatably driven (via rear axle assembly 26, etc.) with virtually no speed differential with respect to intermediate shaft 74. Therefore, selective actuation of the shift fork assembly causes corresponding axial movement of mode sleeve 128 such that transfer case 20 can be shifted "on-the-fly" from its front-wheel, two-wheel drive mode to its four-wheel drive mode without the need of a conventional speed synchronization device. However, it is to be understood that transfer case 20 is readily adapted for use with virtually any type of synchronized mode shift system when rear axle assembly 26 is of the split-shaft type such as that shown and described in U.S. Pat. No. 4,381,828 issued May 3, 1983 to Lunn. In such a case, a speed synchronizer apparatus would be operably installed between hub member 126 and the front end of second output shaft 38 to cause speed synchronization between driven intermediate shaft 74 and non-driven second output shaft 38 prior to permitting mode sleeve 128 to be moved into "lock-up" engagement with external spline teeth 136 on second output shaft 38.

FIG. 3 presents the preferred shift pattern associated with the shift fork assembly for shifting transfer case 20 between its various drive modes and speed ranges. As is conventional, it is generally preferred that movement of mode sleeve 128 and range sleeve 88 be coordinated to maintain direct drive (i.e., high-range) operation during shifting between the two-wheel drive and four-wheel drive modes. One particular shift mechanism that is suited for use with the present invention is disclosed in U.S. Pat. No. 5,076,112 to Williams and which is commonly owned with the present case, the entire disclosure of which is expressly incorporated by reference herein.

The foregoing discussion disclose and describes merely an exemplary embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. In a motor vehicle having a source of power and front and rear set of wheels, a transfer case comprising:
   input means for receiving drive torque from the source of power;
   first output means interconnecting said input means to the front set of wheels for delivering drive torque to the front set of wheels to establish a two-wheel drive mode, said first output means including an intermediate shaft and a front output shaft, said intermediate shaft supported for rotation between said input means and a second output means, said front output shaft driven by said intermediate shaft and being coupled by a front driveline to the front set of wheels;
   said second output means interconnected to the rear set of wheels, said second output means including a rear output shaft coupled by a rear driveline to the rear set of wheels; and
   shift means for selectively coupling said second output means to said first output means to transfer drive torque to the rear set of wheels in addition to the front set of wheels for defining a four-wheel drive mode.

2. The transfer case of claim 1 wherein said shift means includes a mode sleeve fixed for rotation with said first output means and axially movable thereon between a first position decoupled from said second output means for establishing said two-wheel drive mode, and a second position coupled to said second output means for establishing said four-wheel drive mode.

3. The transfer case of claim 1 further comprising second shift means for selectively coupling and decoupling said first output means with said input means.

4. The transfer case of claim 3 further comprising speed reduction means driven by said input means for establishing a reduced ratio speed, said second shift means including a range sleeve fixed for rotation with said first output means and axially movable thereon between a first position engaged only with said input means for driving said first output means with no speed reduction, a second position disengaged from both of said input means and said speed reduction means for delivering no drive torque to said first output means, and a third position engaged only with said speed reduction means for driving said first output means at said reduced ratio speed.

5. The transfer case of claim 1 wherein said shift means includes a mode sleeve fixed for rotation with said intermediate shaft and axially movable thereon between a first position decoupled from said rear output shaft for establishing said two-wheel drive mode, and a second position coupled to said rear output shaft for establishing said four-wheel drive mode.

6. In a transfer case having an input adapted to be rotatably driven about an axis by an engine, and front and rear outputs that rotatively drive front and rear axles of a motor vehicle, respectively, an improvement comprising:
   a power transfer means interconnecting said input to said front output for delivering drive torque from said engine to said front axle for defining a two-wheel drive mode;
   first shift means for permitting a vehicle operator to selectively couple said rear output to said power transfer means for delivering drive torque to said rear axle in addition to said front axle so as to define a four-wheel drive mode; and
   second shift means for selectively coupling said power transfer means to said input for transferring drive torque thereto, and for decoupling said power transfer means from said input to interrupt delivery of drive torque to said power transfer means.

7. The transfer case of claim 6 wherein said first shift means comprises a mode sleeve fixed for rotation with said power transfer means and axially movable thereon between a first position decoupled from said rear output for establishing said two-wheel drive mode, and a second position coupled to said rear output for establishing said four-wheel drive mode.

8. The transfer case of claim 7 wherein said mode sleeve has internal spline means that slidably engage first external spline means formed on said rear output when said mode sleeve is in said second position for connecting said power transfer means to said rear output.

9. The transfer case of claim 6 wherein said second shift means includes a range collar having external spline means for selective slidably engagement with internal spline means formed on said input such that said range collar is adapted to selectively connect said power transfer means to said input.

10. The transfer case of claim 9 wherein said second shift means further comprises a planetary gear set that is rotatively driven by said input, said range collar engaging said gear set in a first position to define a first operating range wherein said power transfer means is driven at a reduced speed ratio, said range collar movable to a second position disengaged from said planetary gear set where no driving of said power transfer means is provided, and said range collar movable to a third position disengaged from said planetary gear set and engaged directly with said input such that said power transfer means is driven with no speed reduction from planetary operation of said planetary gear set.

11. The transfer case of claim 1 wherein the power transfer means includes an intermediate shaft and a chain carrier arrangement for transfer of drive torque from said intermediate shaft to said output, said chain carrier arrangement comprising a drive sprocket fixedly attached to said intermediate shaft, a driven sprocket fixedly attached to said front output and a chain interconnecting said drive sprocket and said driven sprocket.

12. In a motor vehicle having a source of power and front and rear sets of wheels, a transfer case comprising:
input means for receiving drive torque from the source of power;
first output means interconnecting said input means to the front set of wheels for delivering drive torque to the front set of wheels to establish a two-wheel drive mode;
second output means interconnected to the rear set of wheels;
first shift means for selectively coupling said second output means to said first output means to transfer drive torque to the rear set of wheels in addition to the front set of wheels for defining a four-wheel drive mode; and
second shift means for selectively coupling and decoupling said first output means with said input means.

13. The transfer case of claim 12 further comprising speed reduction means driven by said input means for establishing a reduced ratio speed, said second shift means including a range sleeve fixed for rotation with said first output means and axially movable thereon between a first position engaged only with said input means for driving said first output means with no speed reduction, a second position disengaged from both of said input means and said speed reduction means for delivering no drive torque to said first output means, and a third position engaged only with said speed reduction means for driving said first output means at said reduced ratio speed.

14. The transfer case of claim 13 wherein said second output means is a rear output shaft coupled by a rear driveline to the rear set of wheels, and wherein said first output means includes an intermediate shaft supported for rotation between said input means and said rear output shaft and a front output shaft driven by said intermediate shaft, said front output shaft being coupled by a front driveline to the front set of wheels.

15. The transfer case of claim 14 wherein said first shift means includes a mode sleeve fixed for rotation with said intermediate shaft and axially movable thereon between a first position decoupled from said rear output shaft for establishing said two-wheel drive mode, and a second position coupled to said rear output shaft for establishing said four-wheel drive mode.

* * * * *